Feb. 19, 1963  A. R. ESSENBERG  3,077,660
ARTICLE-ASSEMBLING APPARATUS
Filed March 7, 1960  10 Sheets-Sheet 2
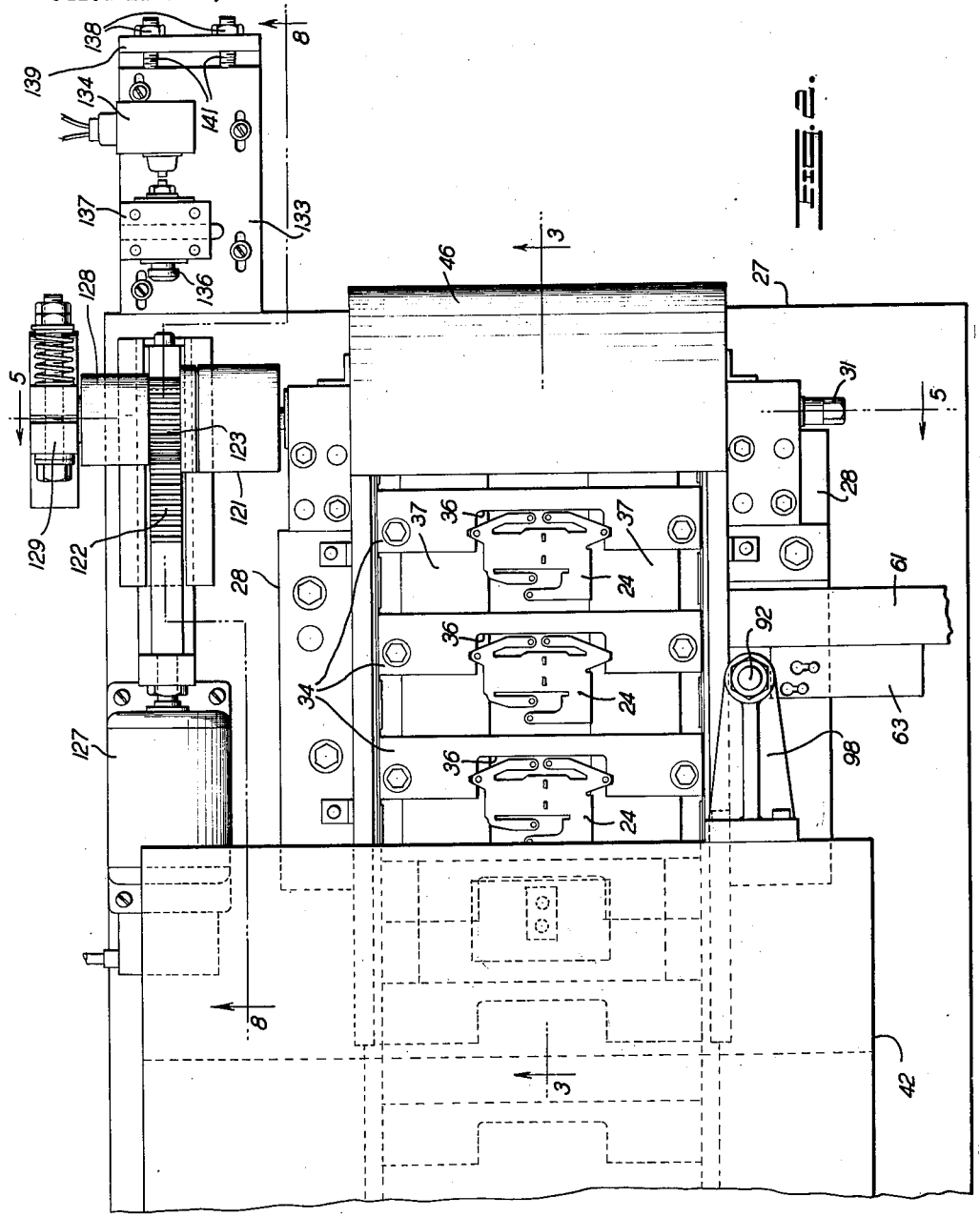
INVENTOR
ALFRED R. ESSENBERG
BY *R. P. Miller*
ATTORNEY

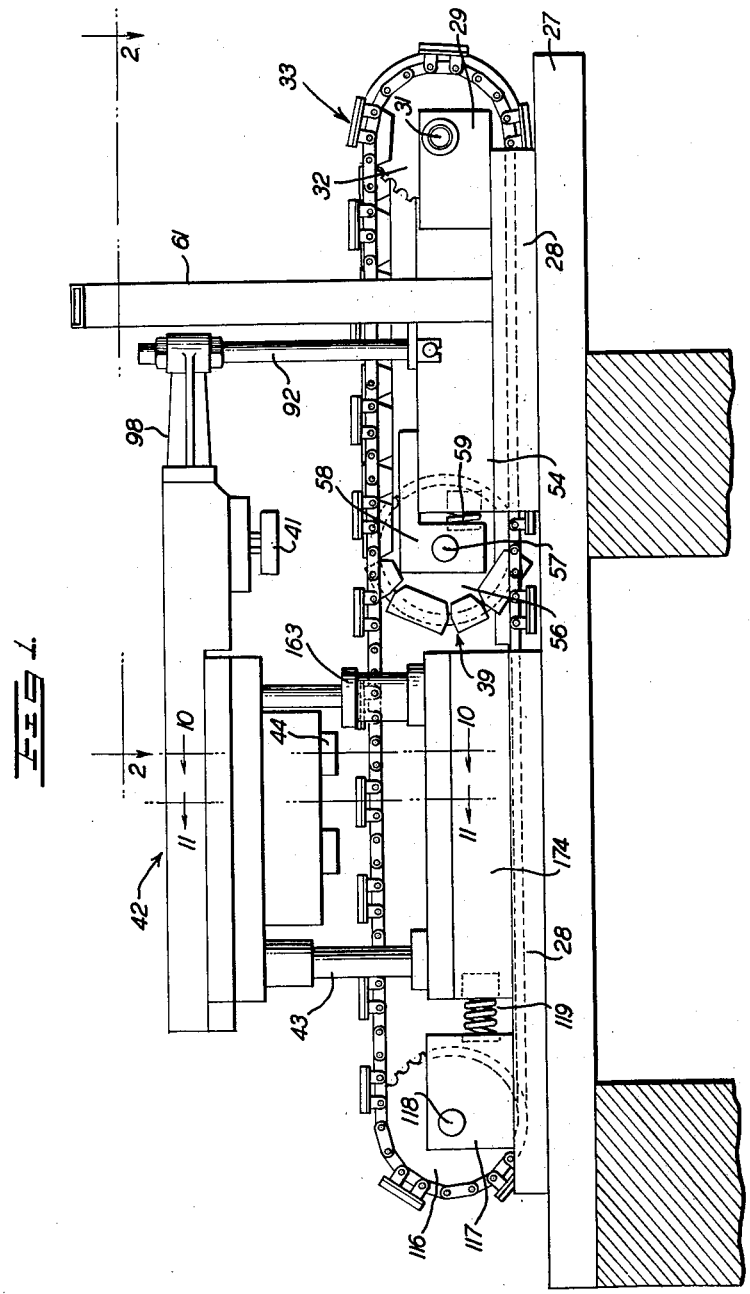

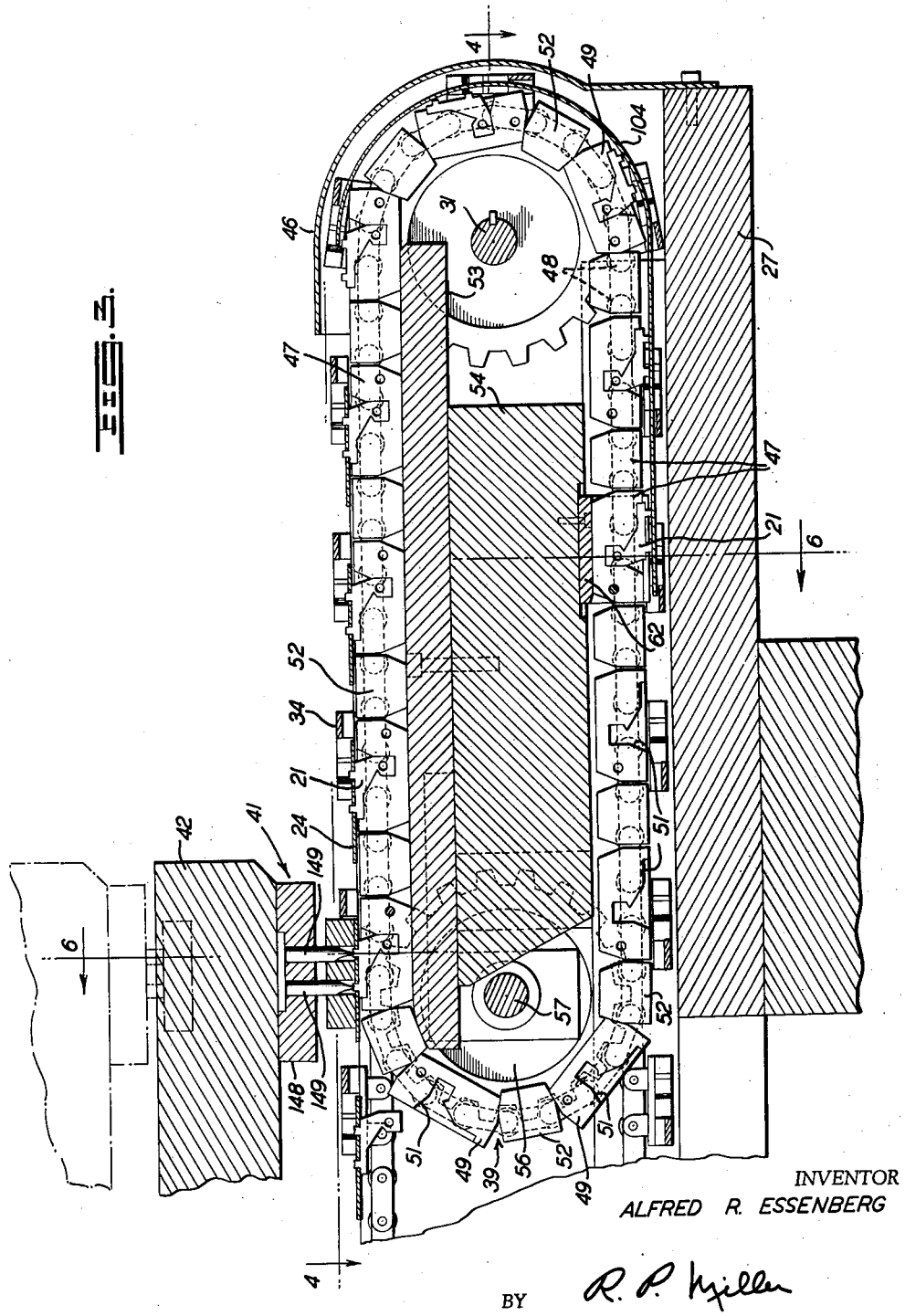

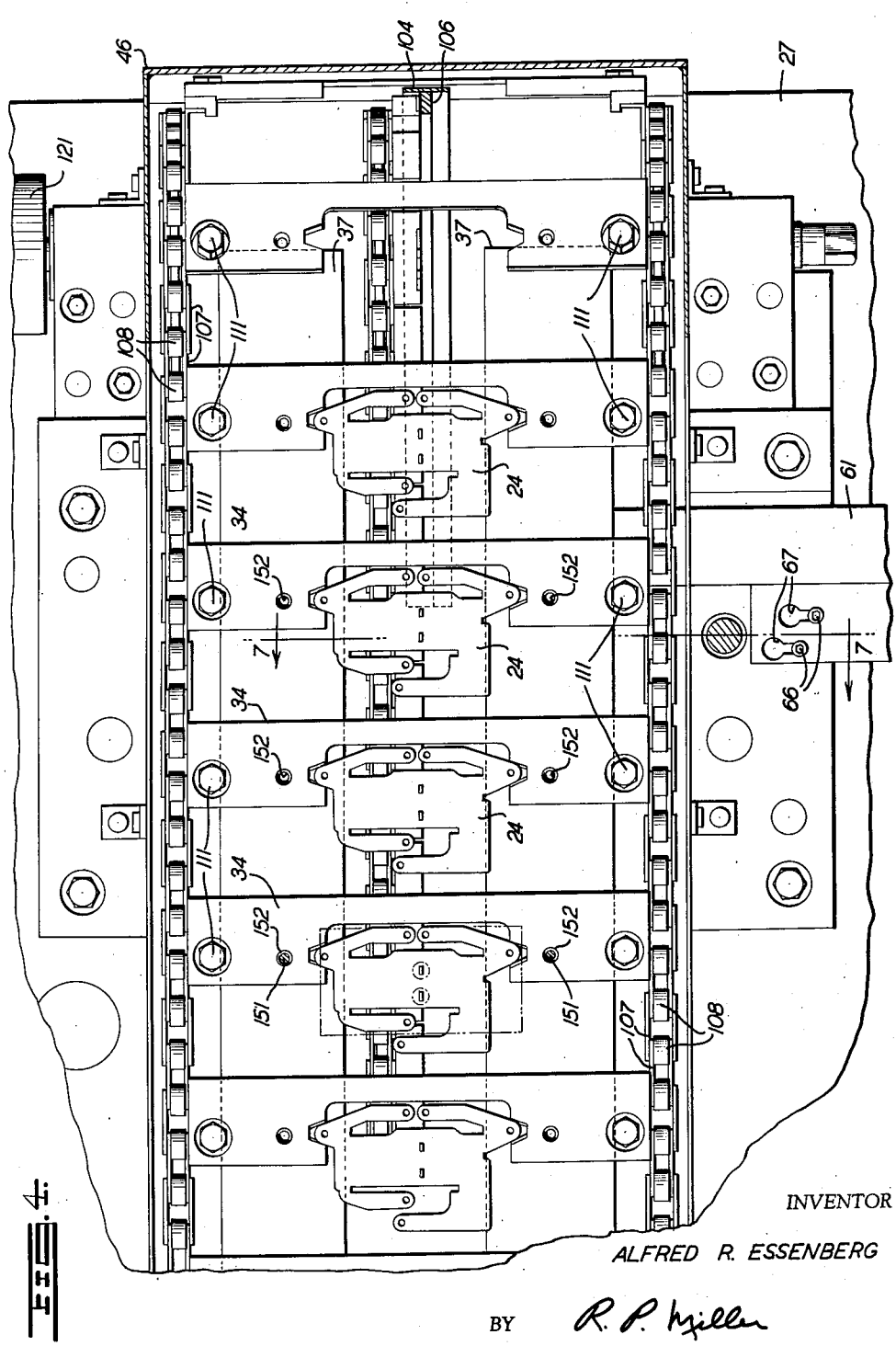

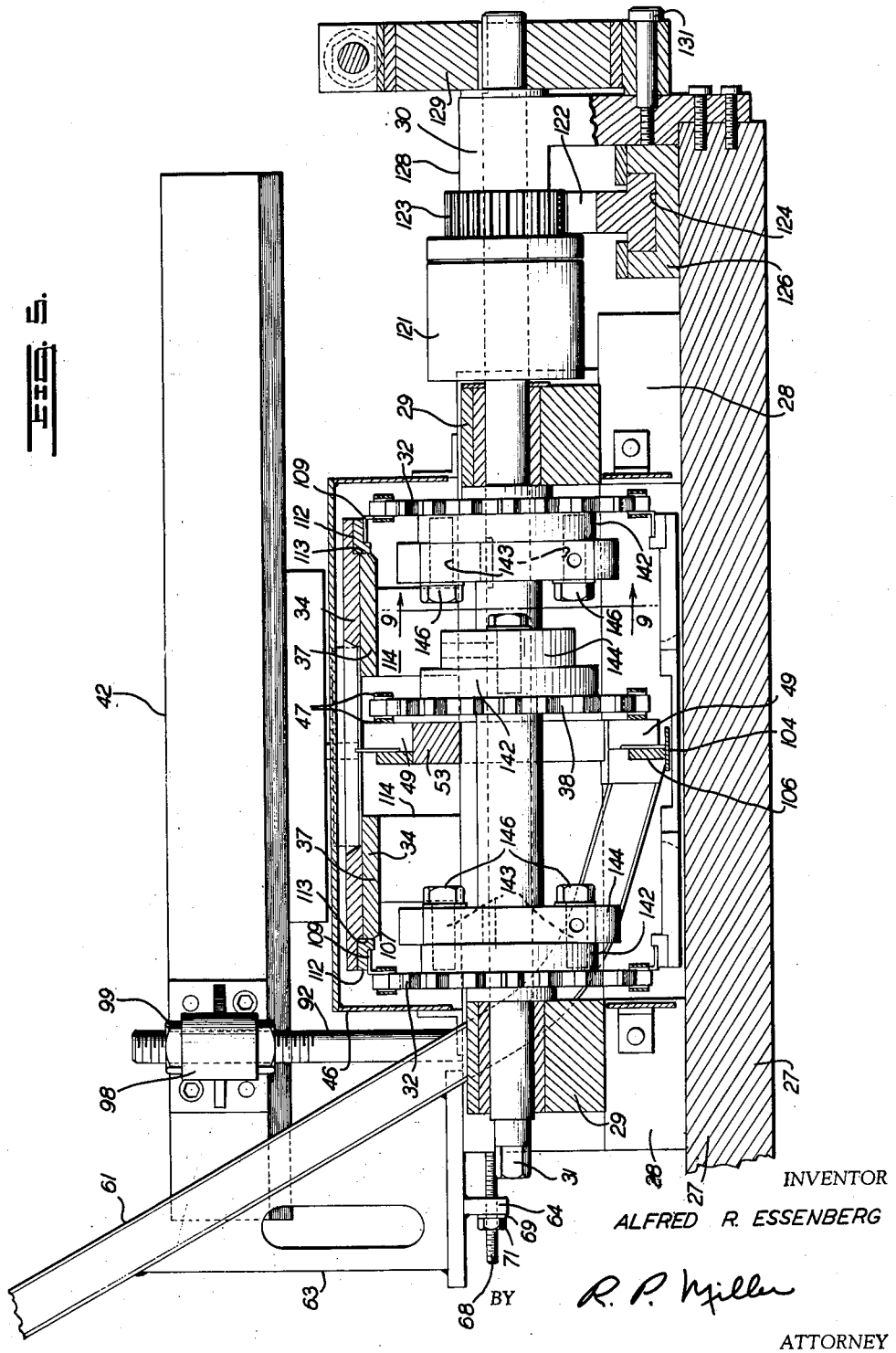

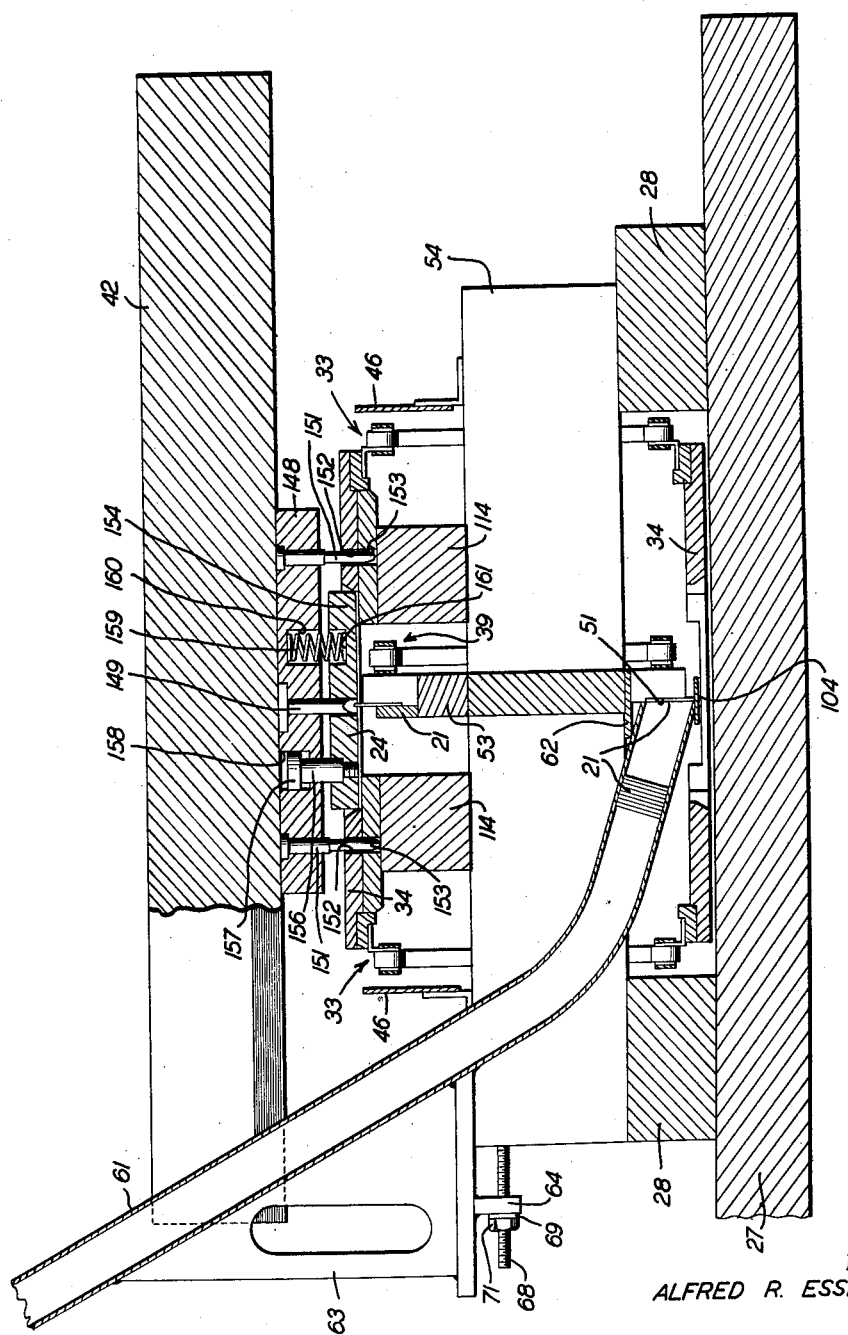

Feb. 19, 1963 A. R. ESSENBERG 3,077,660
ARTICLE-ASSEMBLING APPARATUS
Filed March 7, 1960 10 Sheets-Sheet 7

INVENTOR
ALFRED R. ESSENBERG
BY R. P. Miller
ATTORNEY

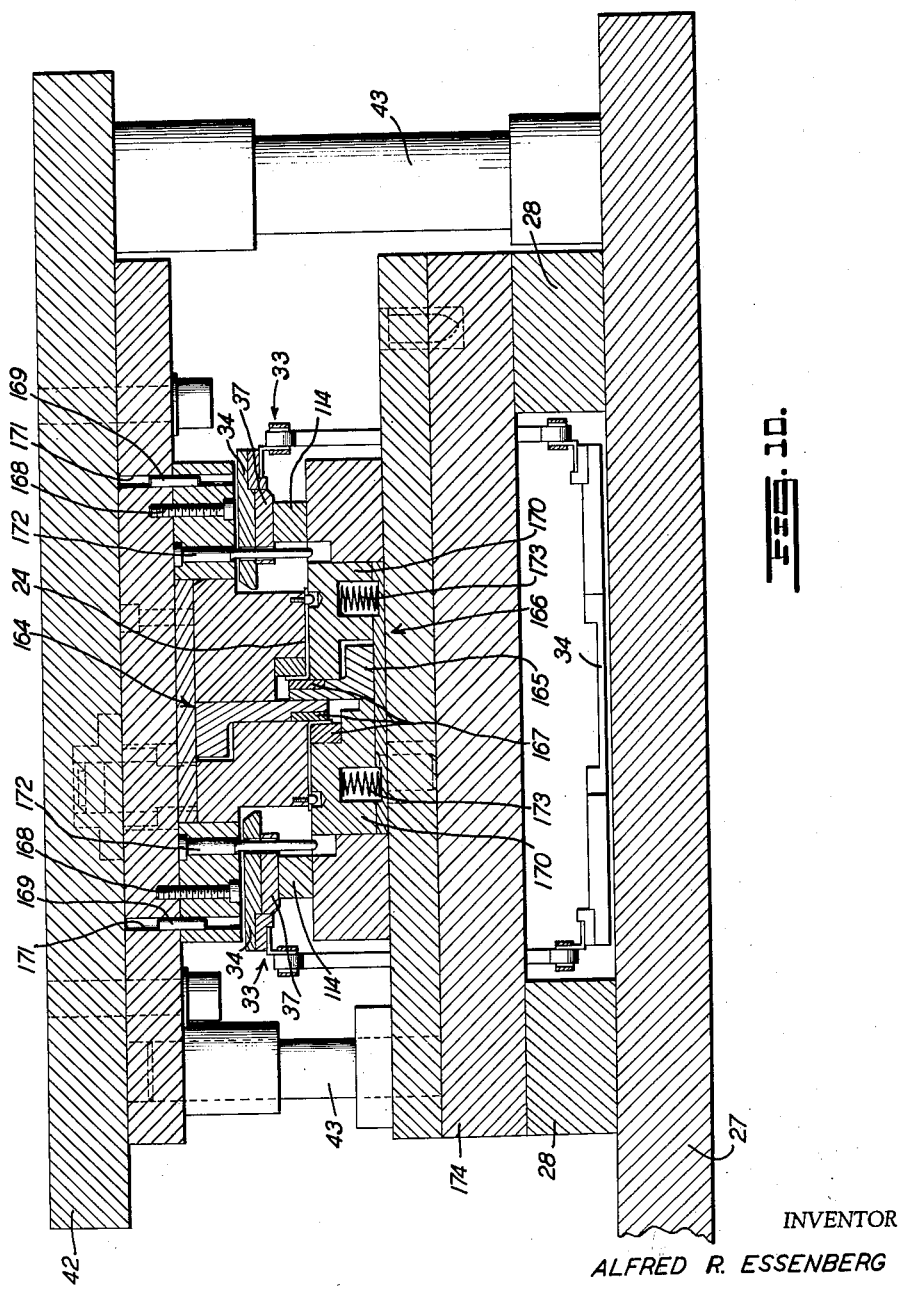

INVENTOR
ALFRED R. ESSENBERG
BY R. P. Miller
ATTORNEY

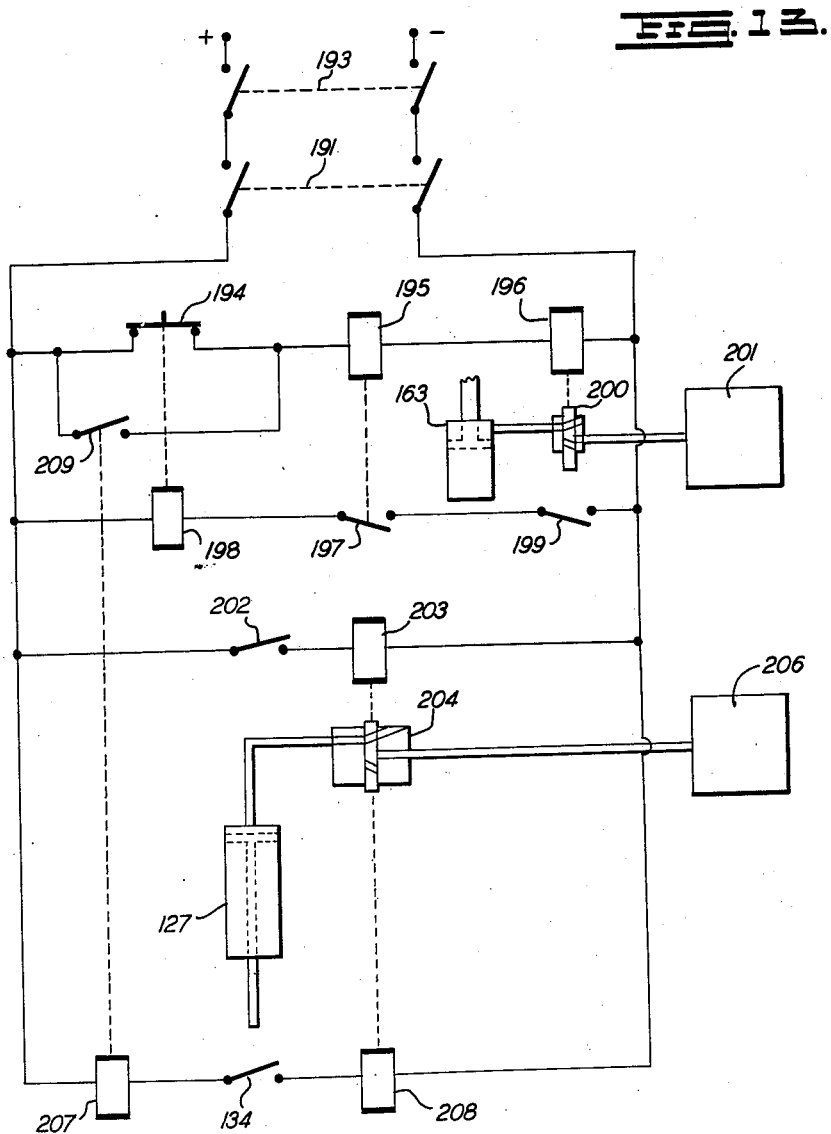

United States Patent Office 3,077,660
Patented Feb. 19, 1963

3,077,660
ARTICLE-ASSEMBLING APPARATUS
Alfred R. Essenberg, Indianapolis, Ind., assignor to Western Electric Company, Incorporated, New York, N.Y., a corporation of New York
Filed Mar. 7, 1960, Ser. No. 13,053
8 Claims. (Cl. 29—208)

This invention relates to article-assembling apparatus and more particularly to devices for staking and forming articles which are being advanced from one fabricating station to another.

In the fabrication of an article it is frequently desirable or necessary to present to a forming or staking tool a plurality of workpieces in predetermined relationship and frequently it is necessary that this relationship be maintained to close tolerances. This is not a serious problem where only one or two workpieces are being fabricated; however, it becomes a problem when a larger number of identical piece parts are being assembled to identical close tolerances.

One object of this invention is to provide an article-assembling means.

Another object of this invention is to provide a device for assembling articles wherein said articles are presented to a tool in a predetermined relationship.

A further object of this invention is to provide a conveyor mechanism for presenting a plurality of pre-oriented workpieces to a plurality of tools.

A still further object of this invention is to provide a device whereby a plurality of simultaneously operated conveyors present a pair of pre-oriented piece parts to a staking and forming mechanism.

With these and other objects in mind, the present invention contemplates a first conveyor having a plurality of apertured piece part holders therein into which a plurality of first piece parts are transferred from a gravity chute. Bracketing the first conveyor is a pair of looped parallel chains having pusher bars therebetween which serve to maintain a second piece part in vertical alignment with the first piece part carried by the conveyor. Said second piece part is supported by and moved upon a pair of parallel skids which are positioned immediately below the pusher bar during a portion of the movement thereof. During the time that the first and second piece parts are thus vertically aligned, a staking tool, under which said piece parts are oriented, is actuated to secure said piece parts together. Subsequently, the piece part unit is presented by the push bar to a forming device.

Other objects and advantages of the invention will become apparent by reference to the following detailed description and the accompanying drawings illustrating a preferred embodiment thereof, in which:

FIG. 1 is a side elevational view of an assembling apparatus embodying the principal features of this invention (a safety shield has been omitted in this view for clarity);

FIG. 2 is an enlarged fragmentary top plan view of one end of the apparatus as viewed on line 2—2 of FIG. 1 showing the drive mechanism therefor;

FIG. 3 is a detailed vertical sectional view taken on the line 3—3 of FIG. 2 showing the vertical orientation of two conveyors;

FIG. 4 is an enlarged plan view of one end of the mechanism as viewed on the line 4—4 of FIG. 3 showing the horizontal orientation of the conveyors;

FIG. 5 is a transverse sectional view showing the drive means for the conveyors and is taken along line 5—5 of FIG. 2;

FIG. 6 is a transverse sectional view taken along line 6—6 of FIG. 3 showing staking facilities and feed chute assemblies;

FIG. 10 is an enlarged vertical sectional view taken along line 10—10 of FIG. 1 showing a forming tool;

FIG. 13 is one possible arrangement of circuitry for the operation of the machine shown in FIG. 1.

Figure 12:
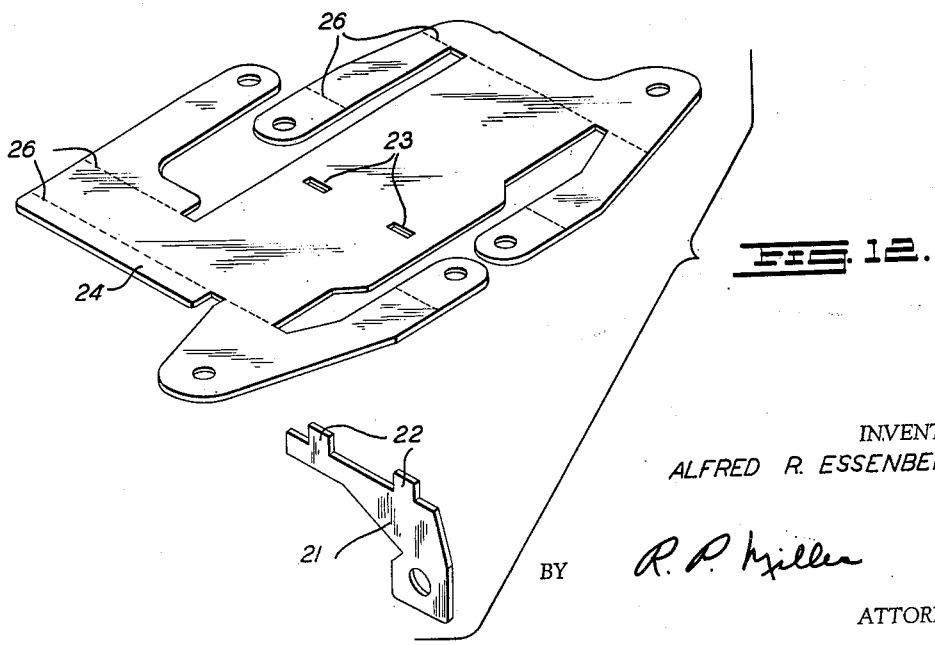
FIG. 12 is an exploded perspective view of the two blanks prior to staking and forming.

Referring now in detail to the drawings, in FIG. 12 there is shown a first piece part 21 having a pair of prongs 22 at the upper edge thereof. The prongs 22 are designed to protrude through a pair of slots 23 formed in a second piece part 24 which is secured to the first piece part 21 by staking of the prongs 22. Subsequent to such staking, the second piece part 24 is formed, for instance, along the dotted lines 26, by a forming mechanism which is incorporated in the instant apparatus.

The means by which the staking and forming operations are accomplished is shown generally in FIG. 1 and includes a base 27 on which two pairs of elongated, parallel supports or support members 28 are secured. Attached to the supports 28, and shown in more detail in FIG. 5, are a pair of bearing blocks 29 in which a driven shaft, indicated generally at 31, is secured for rotation. Rotated by the shaft 31 are a pair of toothed sprockets 32 which engage and drive a pair of identical, parallel, vertically looped chains indicated generally by the numeral 33. As shown in FIG. 2, a plurality of push bars 34, having a cutout portion 36 for engagement with the second piece part 24, are secured to the chains and serve to move the second piece parts along a pair of parallel rails or skids 37. Centrally located between the chains and actuated by the driven shaft 31 through a sprocket 38 is a conveyor, designated generally by the numeral 39, having the first piece parts 21 positioned therein. As shown in FIG. 3, the piece parts 21 held by the conveyor 39 are positioned below and in vertical alignment with the second piece parts 24 moved along the skids 37 by the push bars 34. As the chains and conveyor are simultaneously moved intermittently by the driven shaft 31, a series of the pre-oriented piece parts is presented to a staking tool, indicated generally at 41, secured to a head 42 which reciprocates vertically upon a plurality of guide columns 43. Subsequent to staking, the unitized piece parts are then moved into position beneath a forming tool 44 which is also secured to the reciprocal head 42.

Turning now to the structural details of the above elements, the conveyor 39 (FIGS. 3 and 5), a portion of which is enclosed by a shield 46, consists of a plurality of chain links 47 of standard design which are secured together by a series of pivot pins 48, also of standard design. Attached to the chain links 47 on the lefthand side, as viewed in FIG. 5, are a series of carrier blocks 49 having a cutout portion 51 therein shaped to conform to the configuration of the first piece part 21. Alternating with the carrier blocks 49 and also secured to the links 47 are a series of smaller spacer elements 52 which slide upon a supporting member 53 in the upper run of the conveyor 39, as do also the carrier blocks 49. The supporting member 53 is in turn secured to a portion of a T-shaped body member 54 which rests upon the parallel supports 28. As shown best in FIG. 1, the conveyor 39 also passes over an idler sheave 56 which is mounted for rotation on a shaft 57. The shaft 57 is in turn secured to a sheave support structure 58 which slides upon the body member 54 and is biased therefrom by means of a compression spring 59 by means of which the conveyor 39 is retained in a tensioned condition.

As shown in FIG. 6, a plurality of first piece parts 21 are contained within a gravity chute 61 which presses against a locating plate 62 attached to the body member 54 and is secured to a positioning bracket 63 having an apertured depending portion 64. The bracket 63 rests upon and is removably secured to the body member 54 by means of a pair of threaded elements 66 (FIG. 4) which cooperate with keyhole slots 67 in the positioning member 63. The apertured depending portion 64 of the member 63 in turn cooperates with a threaded rod 68 having a washer 69 and nut 71 mounted thereon. By the use of this mechanism it is possible to move the gravity chute 61 toward and away from the conveyor 39 depending upon the thickness of the piece parts 21 fed therefrom.

Figure 7:
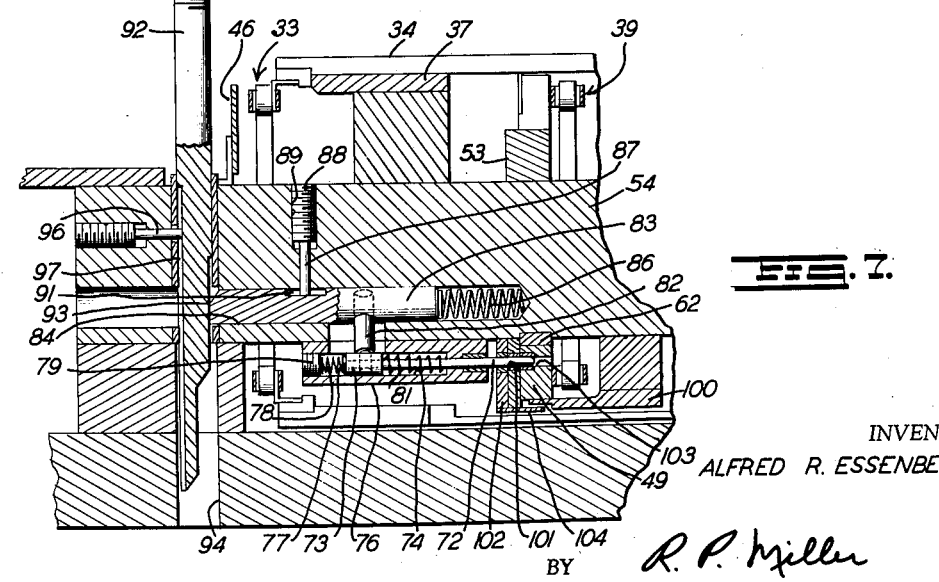
FIG. 7 is an enlarged fragmentary detailed sectional view taken along line 7—7 of FIG. 4 showing a shot pin assembly for aligning two relatively movable elements of the apparatus.

As each of the carrier blocks 49 comes to rest at the outlet of the gravity chute 61, one of the piece parts 21 therein gravitates through said outlet and seats within the aligned cutout portion 51 in the carrier block. To insure the correct alignment of the cutout portion 51 with the outlet of the gravity chute 61, the mechanism shown in FIG. 7 has been developed. This mechanism includes a shot pin 72 which passes through a sleeve 73 contained in a bore 74 formed in a holding fixture 76 secured to the body member 54. An enlarged head 77 of the shot pin 72 is normally held in engagement with the sleeve 73 by means of a compression spring 78, one end of which seats against a threaded plug 79 located in one end of the bore 74. In opposition to the compression spring 78 is a second compression spring 81 on the opposite side of the sleeve 73 which tends to retain the shot pin 72 in a leftward position as viewed in FIG. 7. Rigidly secured to the sleeve 73 is one end of a dowel 82, the other end of which is secured to a sliding plunger 83 located within a bore 84 formed in the body member 54. The sliding plunger is in turn urged to the left, as viewed in FIG. 7, by a coiled compression spring 86, also contained within the bore 84, and is restrained from rotary motion by a pin 87 held by a threaded plug 88 which seats within a second bore 89. The lower extremity of the pin 87 cooperates with a slot 91 formed in the plunger 83 to prevent rotary motion thereof while allowing a limited reciprocal motion which results from the vertical movement of a camming bar 92 cooperating with a bevelled extremity 93 of the sliding plunger 83. The camming bar 92 is in turn contained within a bore 94 of the body member 54 and restrained from rotation therein by means of a pin 96 which cooperates with a slot 97 formed in the bar 92. One extremity of the camming bar 92 is secured to an arm 98 of the reciprocal head 42 by means of a pair of internally threaded members 99 which cooperate with the threaded portion of the camming bar 92. Thus, when the camming bar is in its downward position, as shown in FIG. 7, the sleeve 73, together with the shot pin 72, is moved to the right by the action of the sliding member 83 and the dowel 82. This rightward motion results in the shot pin's entering an aligning aperture 101 formed in a stationary depending member 102 secured to the body 54 and an aperture 103 formed in the carrier block 49 which is supported by a member 100 thereby aligning the carrier block 49 with the chute 61.

As the piece parts 21, thus transferred to the blocks 49, are moved intermittently in a counterclockwise direction by the motion of the conveyor 39, they are restrained from vertical movement by an elongated guide 104 which, as shown in FIGS. 3 and 5, is formed into a curve about the righthand extremity of the conveyor 39. In addition, the piece parts 21 are restrained from lateral motion by means of an upright member 106 (FIG. 5) which is situated immediately adjacent the path of motion of the carrier blocks 49 and secured to the guide 104.

The pair of vertically looped parallel chains 33, which bracket the conveyor 39, are also composed of links 107 and pivot pins 108 (FIG. 4) as in the case of the conveyor chain 59. As shown in FIGS. 4 and 5, there is secured to the links 107 on the inner sides of the chains 33, a plurality of brackets 109 having an L-shaped cross section. Above the horizontal portion of these brackets are the push bars 34 which are secured thereto by threaded members 111, as shown in FIG. 4. Located between the push bars 34 and the L-shaped brackets 109 are spacer elements 112 which form a shoulder 113 to slidably engage the outer extremities of the parallel skids 37 which are supported by means of a pair of elongated blocks 114. As will be obvious from an examination of FIGS. 3 and 4, the second piece parts 24 are supported by the skids 37 and intermittently slid thereon by the action of the push bars 34 which contact the piece parts 24 at the extremities thereof. The central portion of the push bars 34 does not engage the piece parts but rather is cut away in order to furnish clearance for the centrally located conveyor elements 49, as clearly shown in FIG. 3.

As in the case of the conveyor 39, the left ends of the chain loops (FIG. 1), pass over a pair of idler sprockets 116 which are rotatably supported upon slidable blocks 117 by means of a stud shaft 118. The blocks 117 in turn rest upon the parallel support members 28 and are biased to the left, as viewed in FIG. 1, by means of compression springs 119, which arrangement results in the tensioning of the chains 33.

Figure 8:
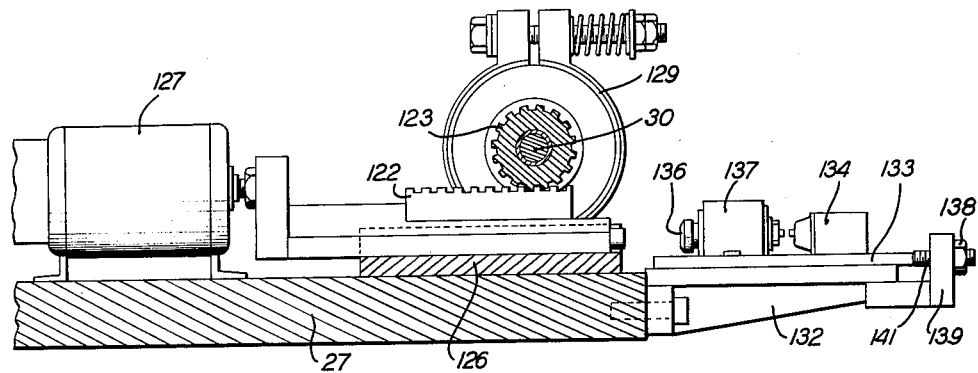
FIG. 8 is a vertical sectional view taken on line 8—8 of FIG. 2 showing the drive means.

The intermittent motion of the conveyor 39 and chains 33 is transmitted thereto from the driven shaft 31 by means of the sprockets 38 and 32, respectively. The shaft 31 in turn is intermittently rotated through a oneway clutch 121 by means of a rack 122 (see FIGS. 2 and 8) and pinion 123 which is attached to an axle 30 aligned with the shaft 31. The rack 122 is slidably positioned within an inverted T-slot formed in guideway 126 and is reciprocated by an air cylinder 127 which is supplied from a source 206 (FIG. 13). Also mounted on the driven shaft 31, and separated from the pinion 123 by an axle housing 128, is a friction brake indicated generally by the numeral 129 of standard design which is secured to the housing 128 by bolts 131 and functions to prevent override when the rack is actuated by the air cylinder 127. Slidably supported upon a bracket 132 (FIG. 8) which is secured to the base 27 is a plate 133 upon which is located a microswitch 134 in alignment with the righthand extremity of the rack member 122. The microswitch is designed to be actuated by the rack member which acts through a force transmitting pin 136 of standard design secured to the plate 133 within a housing 137. As will be obvious from an examination of FIG. 13, as the rack 122 is moved to its extreme righthand position, the microswitch 134 is contacted to exhaust the air cylinder 127 thus returning the rack 122 to its leftward position. Should it be necessary or desirable to adjust the length of the stroke of the rack 122, the slidable plate 133 may be moved horizontally by a pair of nuts which cooperate with an upstanding portion 139 of the bracket 132 and a pair of threaded studs 141 which project from the slidable plate 133. Thus, the relative horizontal portion of the microswitch 134 and the unextended position of the rack 122 may be adjusted by the motion of the plate 133 to vary the distance the conveyor 39 and the chains 33 are moved during each actuation of the rack 122.

Figure 9:
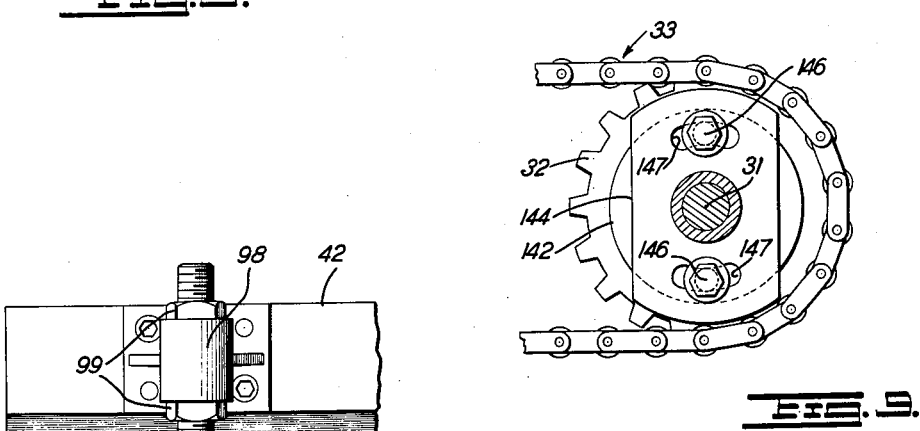
FIG. 9 is a fragmentary vertical sectional view taken on line 9—9 of FIG. 5 showing an adjustment for one of the conveyor chains.

Should it occur that the conveyor 39 and the chains 33 are not precisely aligned to orient the first and second piece parts vertically, means are provided for adjusting the relative position of these components to produce the desired orientation. As shown in FIG. 5, each of the sprockets 32 and 38 is integral with a hub 142 provided with a pair of threaded apertures 143. As shown in FIG. 9, a rotary plate 144 is secured to the driven shaft 31 and to each of the hubs 142 by a pair of bolts 146 which pass through a pair of arcuate slots 147 formed in the plate 144 and seat within the threaded apertures 143. Thus, by loosening the bolts 146 it is possible to make minor relative angular adjustments between the sprockets, which adjustments result in slight relative horizontal displacements between the conveyor 39 and chains 33.

The staking mechanism, which is indicated generally by the numeral 41, in FIG. 1, is shown in more detail in FIGS. 3 and 6 and includes a housing plate 148 which is secured to the reciprocal head 42 and contains a pair of vertical staking tools 149 of well-known design. On either side of the staking tools 149 are a pair of locating pins 151 also secured to the housing plate 148, the lower extremities of which enter apertures 152 formed in the push bars 34 and apertures 153 in the skids 37 to insure the proper vertical alignment thereof. Slight misalignment of the push bars 34 with the lower skids 37 is rectified due to the camming action of the rounded lower extremities of the locating pins 151. In addition, a holddown plate 154 for retaining the piece parts 24 upon the skids 37 is suspended beneath the housing by a pin 156 having an enlarged head 157 which fits within a bore 158 of the housing plate 148. A compression spring 159 is also provided and seats within a bore 160 of the housing plate and a corresponding bore 161 in the hold-down plate 154. Upon elevation of the reciprocal head 42 the plate 154 is forced away from the housing plate 148 by the compression spring 159.

As discussed above, there is secured to the head 42, which is reciprocated vertically by a hydraulic cylinder 163 (FIG. 1), the forming tool, shown in more detail in FIG. 10. This tool comprises a composite upper forming die, indicated generally by the numeral 164, and a lower composite forming die, indicated generally by the numeral 166, and consisting of a stationary portion 165 and two vertically movable portions 170. A plurality of hardened inserts 167 are secured to both the upper and lower dies and form a wearing surface against which the piece part 24 is formed. The upper die 164, which is secured to the reciprocal head 42 by bolts 168 and dowels 169 frictionally held within bores 171, also includes a pair of locating pins 172 similar in design and function to the pins 151. The movable portions 170 of the lower die member 166 are supported by springs 173 which are compressed by the lowering of the upper die 164. When the upper forming die 164 descends and engages a work piece 24 positioned upon the lower forming die 166, such die is forced downwardly until it abuts a portion of a support member 174. Upon such engagement the upper die continues to move a slight distance, thereby completing the forming operation. As the head is moved upwardly by the hydraulic cylinder 163, the portions 170 of the lower forming die 166 are also moved upwardly by the action of the springs 173. At the upward extremity of such motion, the top surface of the portions 170 is parallel with the upper surface of the skids 37 and thus in a position to receive a subsequent work piece unit.

Figure 11:
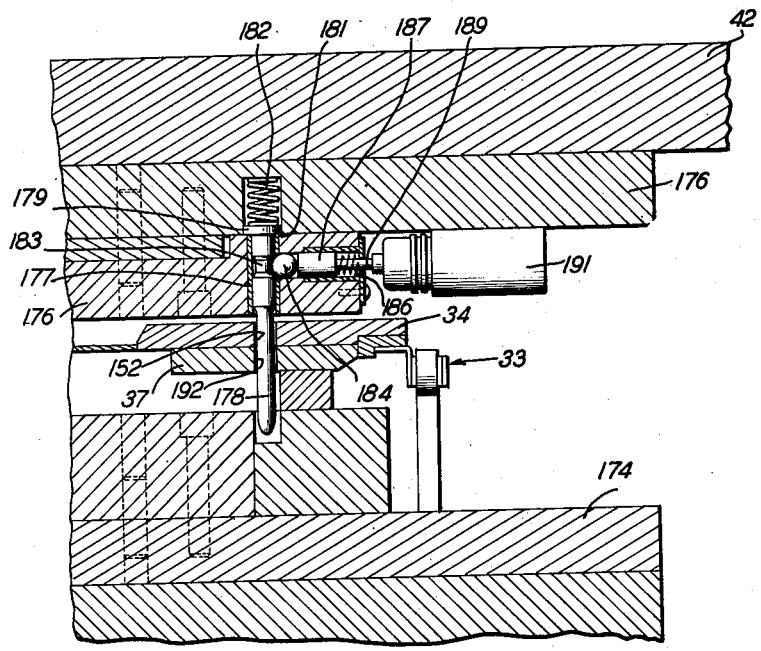
FIG. 11 is an enlarged fragmentary vertical sectional view taken along line 11—11 of FIG. 1 and showing a safety feature of the apparatus.

In addition to the locating pins 172, which are included in the forming tool 44, and the locating pins 156, which are included within the staking tool 41, an additional mechanism is provided to insure the correct alignment of the piece parts with the forming and staking tools. This mechanism is best shown in FIG. 11 and includes a housing 176 having a bore 177 therein in which is retained an elongated locating member 178. The member comprises an enlarged head 179 which is forced downwardly onto a shoulder 181 formed in the bore 177 by means of a compression spring 182. Into a restricted portion 183 of the locating member 178 is seated a spheroid 184 which is held therein by the action of a compression spring 186 pressing upon a cylindrical block 187 disposed within a bore 188 in the housing 176. At the opposite end of the cylindrical block 187, and secured thereto, is a pushrod 189 coacting with a microswitch 191 which is connected in the control circuit for the entire machine. Should it occur that the aperture 152 of a push bar 34 is not properly aligned with an aperture 192 formed in the skid 37, the locating member 178 moves upwardly relative to the spheroid 184 when the housing 176 is moved downwardly by the head 42. Should this happen, the spheroid is moved to the right, as viewed in FIG. 11, resulting in the cylindrical member 187 and the pushrod 189 also being moved to the right to actuate the microswitch 191 and thus deactivate the machine.

Starting with the conveyor at rest and the reciprocal head in its lowered position, operation of this apparatus is as follows. At the end of the forming and staking operation the reciprocal head is raised by the action of the hydraulic cylinder 163, which results in the cam bar 92 being moved upwardly to withdraw the shot pin 72 from the aperture 103 within the carrier block 49, thus freeing the conveyor 39 for subsequent motion. As the reciprocal head 42 reaches its upward position, the hydraulic cylinder 127 is actuated moving the rack 122 outwardly. Upon this motion, the driven shaft 31 moves the conveyor 39 and the chains 33 an amount equal to the distance between any two adjacent workpiece carrier blocks 49 to present a subsequent workpiece to the staking device 41 as well as to the forming device 44. In addition, the cutout portion 51 of a previously empty carrier block 49 is positioned at the outlet of the gravity chute 61, allowing the lowermost piece part therein to be positioned within said cutout portion. It should be noted that while the conveyor is stationary, a second piece part 24 is manually positioned within the cutout portion 36 of a push bar 34 which is positioned at the right of the upper run of the chains 33. As the rack 122 reaches its extreme extended position, it strikes the switch 134 exhausting the air cylinder 127 to retract the rack mechanism 122. As this happens the pinion 123 is rotated in an opposite, clockwise direction. However, this motion is not transmitted to the driven shaft 31 inasmuch as the one-way clutch 121 situated between the pinion 123 and the driven shaft 31 is not engaged during this time. Subsequently, the hydraulic cylinder 163 is also actuated to lower the head 42 whereupon the locating pins 151 and 172 enter their respective apertures to properly position the workpieces 24 beneath the staking and forming tools. Simultaneously, the shot pin 72 is moved into the aperture 103 within the carrier block 49 to exactly position said block at the outlet of the gravity chute 61. Should it happen that the carrier block is slightly out of alignment with the shot pin 72 and the gravity chute 61, the blunted extremity of said pin cams the carrier block into proper position in an obvious manner, thus insuring the correct alignment with the gravity chute with the cutout portion of the carrier block. Such downward motion also results in a staking and forming operation in the manner disclosed above, at the end of which the device is in condition to be recycled.

One possible arrangement of circuitry whereby the above sequence of operations may be accomplished is represented in FIG. 13 wherein the safety switch 191 is represented as being positioned in the line between a voltage source (not shown) and the rest of the voltage control circuitry. When it is desired to begin the operation of the machine, a start button 194 is momentarily depressed by the operator to activate a relay coil 195 and a solenoid coil 196. Upon actuation the relay coil 195 closes contacts 197 to establish voltage across a relay 198 and through a normally closed microswitch 199. The actuation of the coil 198 retains the starting switch 194 in its engaged position in the manner of a standard holding circuit. Simultaneously, the solenoid coil 196 moves a solenoid valve 200 into an upward position as viewed in FIG. 13, thereby establishing communication between a source of hydraulic pressure 201 and the hydraulic cylinder 163. As this happens the hydraulic cylinder 163 moves the head 41 downwardly. At the lowermost position of the head 41, the microswitch 199 is momentarily opened to break the hold circuit for the starting switch 194 thereby deactivating the solenoid coil 196 to exhaust the cylinder 163. When the cylinder 163 is exhausted, the head 41 is returned to an upward position.

Immediately prior to the time that the head 41 reaches its extreme upward position, it momentarily engages a normally open one-way microswitch 202 to actuate a solenoid coil 203 whereupon a solenoid valve 204 is moved upwardly as viewed in FIG. 13. Upon the motion of the solenoid valve 204, a source of pneumatic pressure 206 is placed into communication with the cylinder 127 thereby moving the rack 122 outwardly. As previously discussed, the end of the rack 122 strikes a microswitch 134 when it reaches its extreme position. Thereupon, a relay 207 and solenoid coil 208 are momentarily actuated. Upon the actuation of the solenoid coil 208, the solenoid valve is moved to place the source of pneumatic pressure out of communication with the cylinder 127 and exhaust the cylinder 127 to return the rack 122 to its retracted position. Simultaneously, the relay 207 momentarily closes a contact 209 to again actuate the relay coil 195 and the solenoid coil 196 to recycle the machine. Subsequently, the switch 194 may be opened to stop further operation of the machine.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an article advancing apparatus, a closed loop conveyor, means for mounting said conveyor for movement in a vertical plane, a holder mounted on said conveyor, said holder having a horizontal aperture, a shot pin mounted for projection into the path of movement of said holder for movement into said aperture, means for incrementally advancing said conveyor to move said holder to position the aperture in alignment with said pin, a vertically reciprocating arm, means operated by said advancing means following each advance of the conveyor for operating said reciprocating arm, a cam mounted on and moved by said reciprocating arm, and means engaged and operated by said cam for advancing said pin into the aligned aperture in the holder.

2. In an article advancing apparatus, a loop conveyor, means for mounting said conveyor to move in a vertical plane, a first holder mounted on said first conveyor, a pair of looped chains, means for mounting said chains to move in vertical planes on opposite sides of said conveyor, a work pusher mounted on said chains, means for incrementally advancing said chains and conveyor, a first locking means for engaging said first holder to lock said conveyor, a second locking means for engaging said pusher to lock said chains, and means rendered effective following each incremental advance of said conveyor and chains for actuating said first and second locking means.

3. A mechanism for presenting an article to a tool which comprises a support, an intermittently movable endless chain conveyor mounted on the support, a block having an aperture therein secured to said conveyor, said block also having a vertical cutout portion shaped to conform to the configuration of said article, a gravity chute mounted on the support for containing a plurality of said articles, said chute having a vertical outlet therein juxtaposed to the path of said vertical output portion, a locking pin mounted on the support for momentarily entering said aperture in the block of lock said cutout portion in alignment with said outlet whereby an article within said chute gravitates therefrom into said cutout, and a driven shaft mounted on the support in operative engagement with the conveyor for actuating said conveyor to position said article beneath said tool.

4. Apparatus for assembling piece parts which comprises a support, a tool secured to the support for assembling first and second piece parts, means mounted on the support for positioning a first piece part for subsequent engagement by said tool, a pair of intermittently movable, looped chains mounted on the support for straddling said positioning means, a push bar having a surface for engaging a second piece part, means for securing and suspending said bar betwen said pair of chains in alignment with said first piece part carried by said positioning means, a pair of skids mounted on said support for slidably supporting said second piece parts while said piece parts are engaged by said push bar, and means attached to the support for intermittently actuating said positioning means and said chains to present said first and second piece parts to said tool.

5. An apparatus for assembling articles which comprises a support, a vertically looped, intermittently movable conveyor having a plurality of article receiving means thereon mounted on said support, an inclined chute mounted on said support through which a plurality of first articles gravitate, said chute having an outlet in juxtaposition with said article receiving means whereby said first articles gravitate singly through said outlet into said article-receiving means, means attached to said support for aligning said article receiving means with said outlet, a pair of skids mounted on the support above said conveyor for slidably supporting a plurality of second articles, means mounted on said support for positioning said second articles in vertical alignment with said first articles held within said article holding means, means mounted on the support for assembling said first and second articles while said articles are in vertical alignment, and means attached to said support for actuating said conveyor and said positioning means simultaneously whereby said first and second articles are presented to said assembling means in vertical alignment.

6. An apparatus for assembling piece parts which comprises a gravity chute for a plurality of first piece parts, an intermittently driven conveyor movable past said chute, a plurality of workpiece carriers attached to said conveyor, said carriers having a cutout portion shaped to conform to the shape of said first piece parts whereby each such cutout portion receives a piece part upon alignment with said chute, a pair of intermittently movable chains exterior of said conveyor and parallel therewith, a plurality of spaced workpiece engaging members having two extremities, said extremities being attached to said pair of chains such that the workpiece engaging members are suspended between and moved by said pair of chains, a portion of said workpiece engaging members being shaped to conform to the shape of a second piece part, means for actuating said chains to advance the workpiece engaging members and the workpiece carriers in vertical alignment during a portion of the travel thereof, a member beneath said work engaging members for slidably supporting said second piece part, staking apparatus for assembling said first and second piece parts, means for mounting said staking apparatus above the chains at a point at which the workpiece engaging members and said workpiece carriers are in vertical alignment, and means for moving said staking apparatus into engagement with said workpieces.

7. A mechanism for orienting articles beneath an assembly tool which comprises a conveyor provided with an article holder, said article holder having a vertical recess formed therein for receiving a first article so that projections provided on the article extend upwardly therefrom, pushing means straddling the article holder for supporting a second article above the first article to position an aperture formed in the second article in a predetermined relationship with the projection, a reciprocable pin for aligning the pushing means beneath the tool to position the projection for engagement with the tool to assemble the articles, power means for reciprocating the pin, and advancing means operated alternately with said power means for moving the conveyor and pusher means in divergent paths to remove the first article from the recess and suspend the first article from the second article.

8. In an article advancing apparatus, a conveyor, a holder mounted on said conveyor, spaced chains mounted for movement on opposite sides of the conveyor, a work pusher mounted on the chains, means for intermittently advancing the conveyor and the chains, locking means for engaging said holder and said pusher to lock said holder and pusher, and means rendered effective after each advance of the conveyor and chains for actuating said locking means.

References Cited in the file of this patent
UNITED STATES PATENTS

| | | |
|---|---|---|
| 1,735,609 | Frederick | Nov. 19, 1929 |
| 2,304,436 | Bell | Dec. 8, 1942 |
| 2,392,169 | Mansfield | Jan. 1, 1946 |
| 2,398,550 | Nelson | Apr. 16, 1946 |
| 2,570,589 | Phillips | Oct. 9, 1951 |